United States Patent
Yoshinaga et al.

(10) Patent No.: US 10,985,423 B2
(45) Date of Patent: Apr. 20, 2021

(54) BATTERY PACK

(71) Applicant: HONDA MOTOR CO., LTD., Tokyo (JP)

(72) Inventors: Nariyuki Yoshinaga, Wako (JP); Ryo Shinoda, Wako (JP); Eiji Koike, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 16/386,434

(22) Filed: Apr. 17, 2019

(65) Prior Publication Data

US 2019/0326570 A1    Oct. 24, 2019

(30) Foreign Application Priority Data

Apr. 18, 2018 (JP) .............................. JP2018-079618

(51) Int. Cl.
*H01M 2/10* (2006.01)
*H01M 50/20* (2021.01)
*B60L 50/64* (2019.01)
*B60L 50/60* (2019.01)

(52) U.S. Cl.
CPC ............. *H01M 50/20* (2021.01); *B60L 50/64* (2019.02); *B60L 50/66* (2019.02); *H01M 2200/00* (2013.01); *H01M 2220/20* (2013.01)

(58) Field of Classification Search
CPC .... B60L 50/64; B60L 50/66; H01M 2200/00; H01M 2220/20; H01M 2/1077; H01M 2/1083
See application file for complete search history.

(56) References Cited

U.S. PATENT DOCUMENTS

2016/0160533 A1    6/2016    Fujii

FOREIGN PATENT DOCUMENTS

| JP | H10-334870 A | 12/1998 |
|---|---|---|
| JP | 2009-054329 A | 3/2009 |
| JP | 2016-25074 A | 2/2016 |

OTHER PUBLICATIONS

Machine Translation JP2016025074(A) (Year: 2016).*
Extended European Search Report dated Sep. 11, 2019, issued in counterpart EP Application No. 19169852.1. (5 pages).
Office Action dated Nov. 20, 2019, issued in counterpart JP Application No. 2018-079618, with English translation. (6 pages).

* cited by examiner

*Primary Examiner* — Victoria H Lynch
(74) *Attorney, Agent, or Firm* — Westerman, Hattori, Daniels & Adrian, LLP

(57) ABSTRACT

In a battery pack, a cover is fixed to a case by a special component. A first service plug includes a special tool detaching the special component. Part of the first service plug or part of a first lid closing it and part of a second service plug or part of an annular component between a second housing part and a second lid closing it are superimposed together via a superimposed part. In the superimposed part, part of the first service plug or part of the first lid is positioned on a deeper side in a direction where the first service plug and the first lid are detached. Accordingly, the first service plug cannot be detached unless the second service plug is detached, and unless both the first and second service plugs are detached, the cover cannot be detached from the case using the special tool, thus ensuring safety.

9 Claims, 7 Drawing Sheets

BATTERY PACK

BACKGROUND OF THE INVENTION

Field of the Invention

The present invention relates to a battery pack comprising a plurality of batteries that drive an electric vehicle, a cover and a case that houses the plurality of batteries, a first service plug and a second service plug that cut off electrical connection of the plurality of batteries, and a first housing part and a second housing part that are provided on the case and house the first service plug and the second service plug respectively.

Description of the Related Art

Japanese Patent Application Laid-open No. 2016-25074 has made known an arrangement in which, in order to prevent a terminal cover of a battery pack housing a high voltage battery from being inadvertently opened, the terminal cover is fixed to a housing by a specially-shaped bolt, and a specially-shaped tool is disposed at a position where it is covered by a service plug that cuts off a high voltage circuit so that, unless the service plug is pulled out and the high voltage circuit is cut off, the specially-shaped tool cannot be taken out and the terminal cover therefore cannot be opened by loosening the specially-shaped bolt.

When two high voltage circuit lines are disposed in parallel within a battery pack and the two high voltage circuits each include a service plug, even if only one of the service plugs is pulled out, the other service plug remains fitted, and it is necessary to employ a structure in which the battery pack can only be opened in a state in which the two service plugs are pulled out.

SUMMARY OF THE INVENTION

The present invention has been accomplished in light of the above circumstances, and it is an object thereof to provide a battery pack that includes two service plugs for which its cover cannot be inadvertently opened.

In order to achieve the object, according to a first aspect of the present invention, there is provided a battery pack comprising a plurality of batteries that drive an electric vehicle, a cover and a case that houses the plurality of batteries, a first service plug and a second service plug that cut off electrical connection of the plurality of batteries, and a first housing part and a second housing part that are provided on the case and house the first service plug and the second service plug respectively, wherein the cover is fixed to the case by a special component, the first service plug comprises a special tool that detaches the special component, part of the first service plug or part of a first lid that closes the first housing part and part of the second service plug or part of a component disposed between the second housing part and a second lid that closes the second housing part are superimposed on one another via a superimposed part, and in the superimposed part, part of the first service plug or part of the first lid closing the first housing part is positioned on a deeper side in a direction in which the first service plug and the first lid are detached.

In accordance with the first aspect, the battery pack includes the plurality of batteries for driving an electric vehicle, the cover and the case housing the plurality of batteries, the first service plug and the second service plug for cutting off electrical connection of the plurality of batteries, and the first housing part and the second housing part provided on the case and housing the first service plug and the second service plug respectively.

Since the cover is fixed to the case by the special component, the first service plug includes the special tool for detaching the special component, part of the first service plug or part of the first lid closing the first housing part and part of the second service plug or part of the component disposed between the second housing part and the second lid closing the second housing part are superimposed on one another via the superimposed part, and in the superimposed part, part of the first service plug or part of the first lid closing the first housing part is positioned on the deeper side in the direction in which the first service plug and the first lid are detached, the first service plug cannot be detached unless the second service plug is detached, and unless both the first and second service plugs are detached the cover cannot be detached from the case using the special tool, thus ensuring the safety.

According to a second aspect of the present invention, in addition to the first aspect, the component disposed between the second housing part and the second lid is an annular component that is fitted into an inner periphery of the second housing part via a seal member, the annular component comprises a projecting portion outside the seal member, and the projecting portion is superimposed on a front side of the first lid.

In accordance with the second aspect, since the component disposed between the second housing part and the second lid is the annular component fitted into the inner periphery of the second housing part via the seal member, the annular component includes the projecting portion outside the seal member, and the projecting portion is superimposed on the front side of the first lid, while preventing, by the projecting portion of the annular member, the first service plug from being detached prior to the second service plug, it is possible to prevent the projecting portion from impairing the sealing properties of the seal member.

According to a third aspect of the present invention, in addition to the second aspect, the annular component comprises an engagement portion that can engage with the second service plug, and part of the engagement portion is superimposed further on a deep side than part of the second service plug.

In accordance with the third aspect, since the annular component includes the engagement portion, which can engage with the second service plug, and part of the engagement portion is superimposed further on the deep side than part of the second service plug, the annular component cannot be detached unless the second service plug is detached, the first service plug cannot be detached either unless the annular component is detached, and it is impossible to access the special tool unless both of the first and second service plugs are detached, thus further improving the safety.

According to a fourth aspect of the present invention, in addition to any one of the first to third aspects, the case and the cover are disposed beneath a floor of a vehicle.

In accordance with the fourth aspect, since the case and the cover are disposed beneath a floor of a vehicle, there is a possibility that water or mud will become attached to the first and second service plugs, but since the first and second service plugs are housed in the first and second housing parts blocked by the first and second lids, there is no possibility that water or mud will become attached thereto.

According to a fifth aspect of the present invention, in addition to the fourth aspect, the first housing part and the second housing part are provided on a side wall of the case.

In accordance with the fifth aspect, since the first housing part and the second housing part are provided on a side wall of the case, not only is it possible to access the first and second service plugs in a state in which the battery pack is mounted on a vehicle, but it also becomes difficult for the first and second service plugs to be damaged due to contact with the ground compared with a case in which the first housing part and the second housing part are provided on a bottom wall of the case.

Note that battery modules 12 of an embodiment correspond to the batteries of the present invention, special bolts 15 of the embodiment correspond to the special component of the present invention, an annular component 36 of the embodiment corresponds to the component of the present invention, an interlock bar 36a of the embodiment corresponds to the engagement portion of the present invention, and an interlock projection 36b of the embodiment corresponds to the projecting portion of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is explained below by reference to FIG. 1 to FIG. 7B. In the following description reference numbers corresponding to components of an exemplary embodiment are included only for ease of understanding, but the applicant's claims are not limited to the exemplary embodiment or to specific components of the exemplary embodiment.

Figure 1:
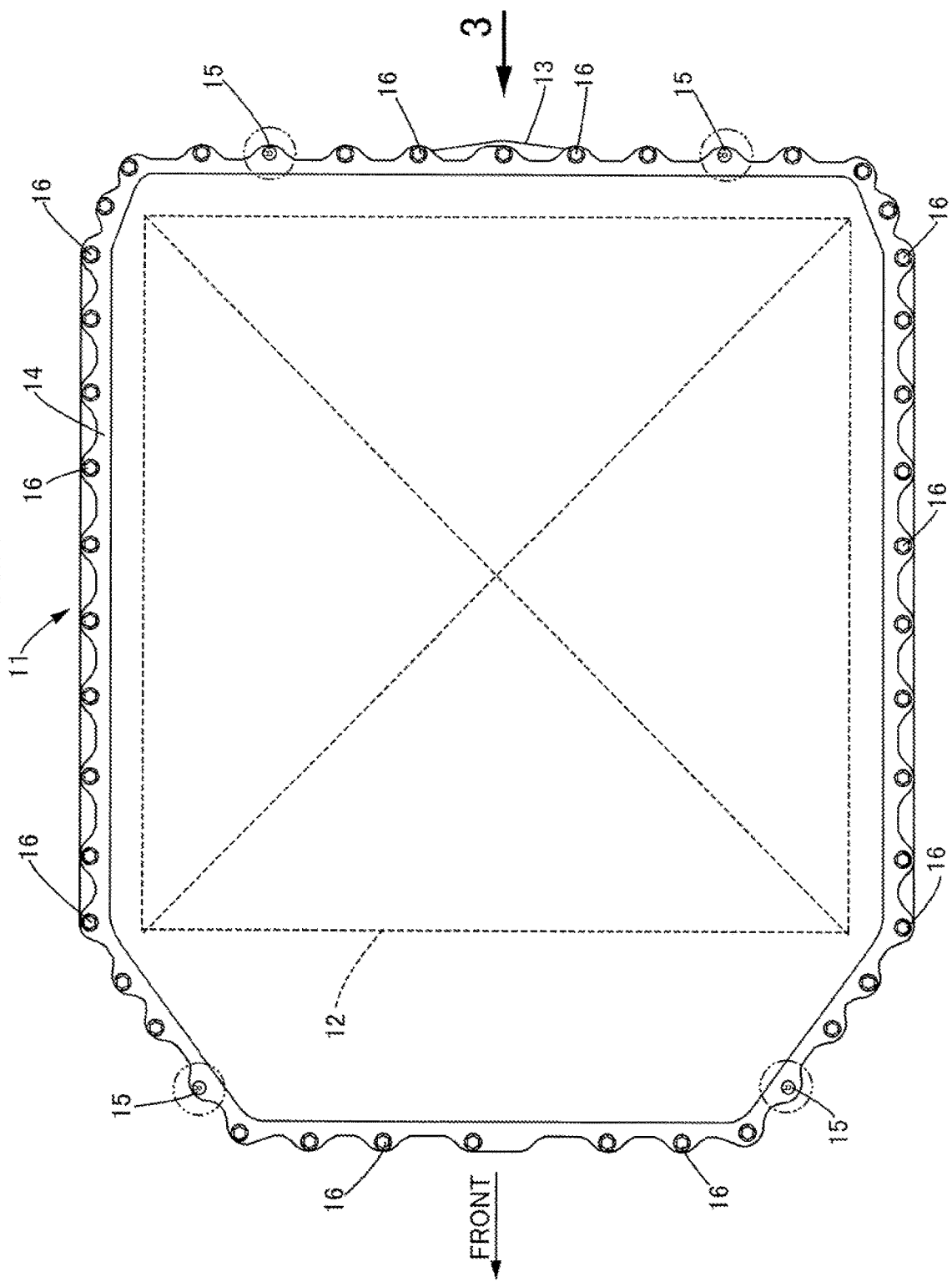
FIG. 1 is a plan view of a battery pack of an electric vehicle.

As shown in FIG. 1, a battery pack 11 mounted on an electric vehicle includes a case 13 housing twelve battery modules 12 and a cover 14 blocking an opening in an upper face of the case 13, an outer peripheral part of the cover 14 being fastened to the case 13 by a plurality of bolts. Among the plurality of bolts, four thereof are special bolts 15, which have a different shape for the head part from that of other normal bolts 16.

Figure 2:
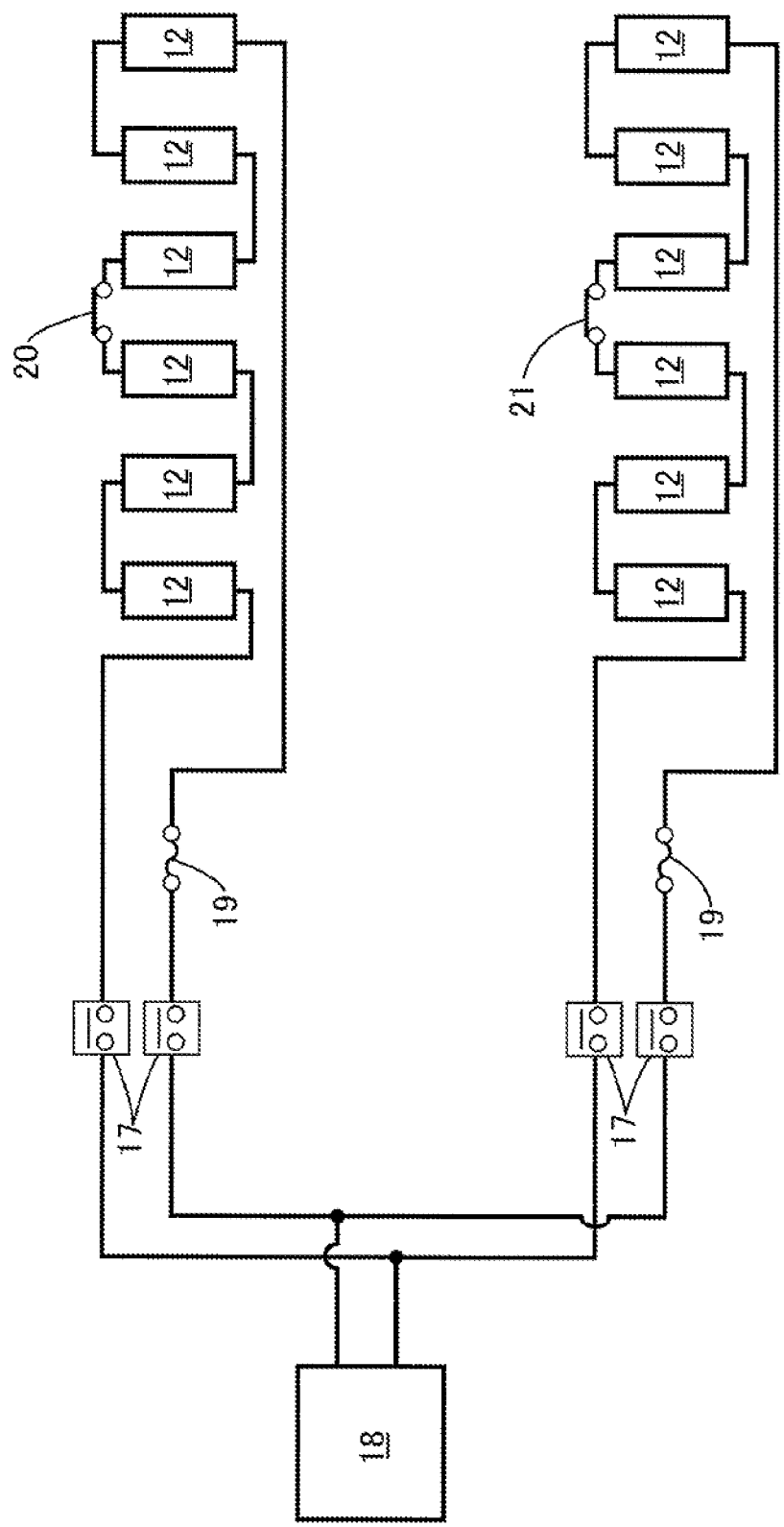
FIG. 2 is an electric circuit diagram of the battery pack.

As shown in FIG. 2, the twelve battery modules 12 are connected in series in sixes, and the two series circuits are connected in parallel to a motor control unit 18 on the downstream side of main contactors 17. One of the series circuits is provided with a fuse 19 and a first service plug 20, and the other series circuit is provided with a fuse 19 and a second service plug 21. When the cover 14 is detached from the case 13 of the battery pack 11, pulling out the first service plug 20 and the second service plug 21 in advance so as to cut off the two series circuits ensures the safety of a worker. In the present embodiment, due to an arrangement in which the first service plug 20 cannot be pulled out unless the second service plug 21 is pulled out and the special bolts 15 cannot be detached unless the first service plug 20 is present, the safety of a worker is ensured.

Figure 3:
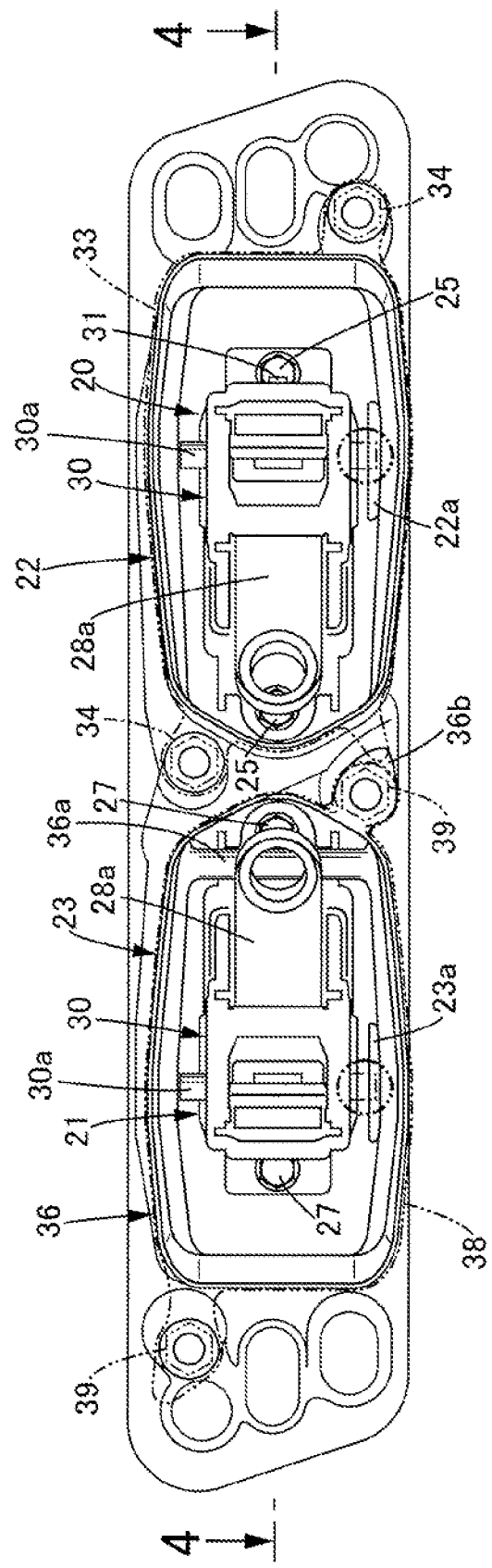
FIG. 3 is an enlarged view from arrow 3 in FIG. 1.
Figure 4:
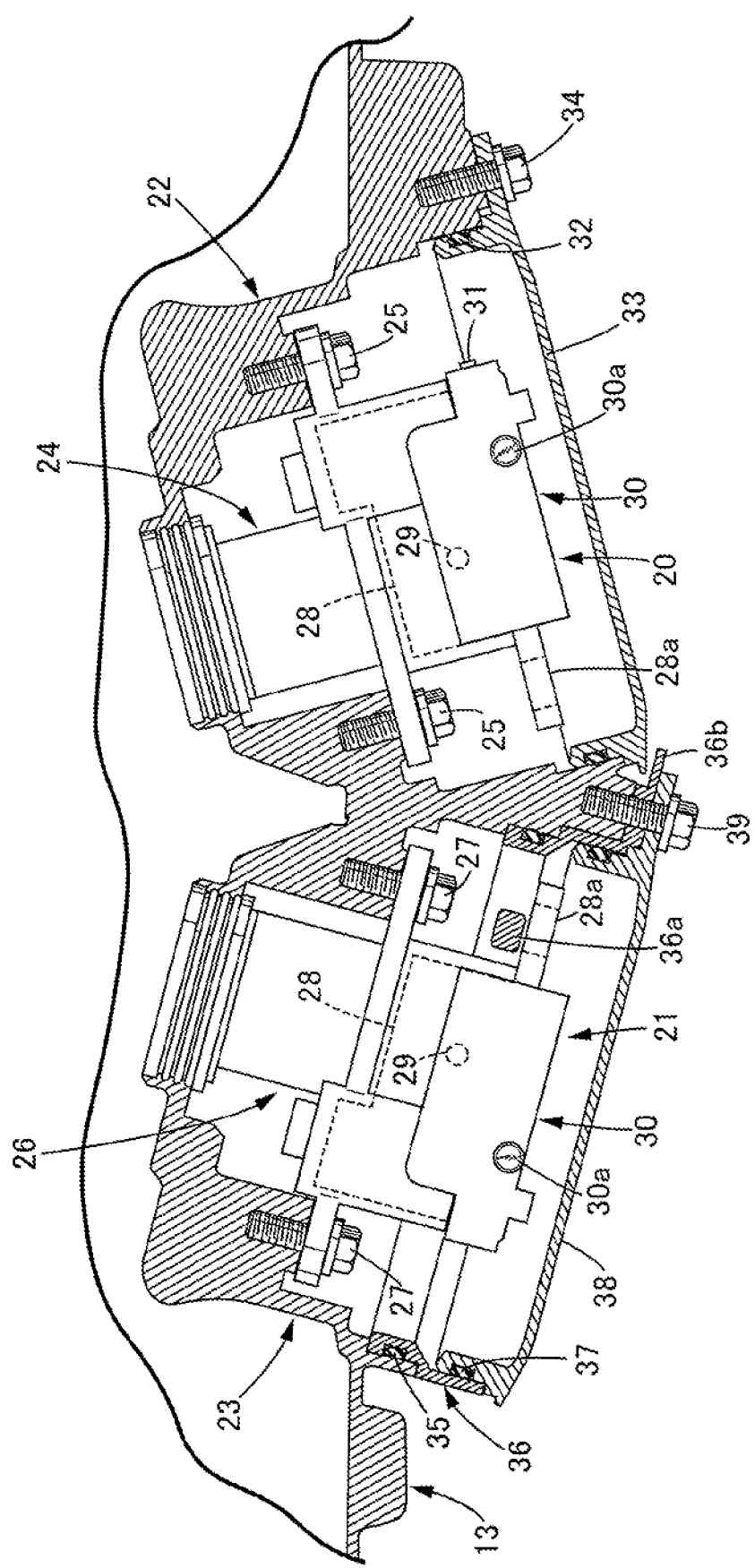
FIG. 4 is a sectional view along line 4-4 in FIG. 3.

As shown in FIG. 3 and FIG. 4, a first housing part 22 and a second housing part 23 are formed on a rear side face of the case 13 of the battery pack 11, a first plug fitting part 24 into which the first service plug 20 is fitted is fixed to a deep side of the first housing part 22 with bolts 25, and a second plug fitting part 26 into which the second service plug 21 is fitted is fixed to a deep side of the second housing part 23 with bolts 27. When the first service plug 20 is pulled out from the first plug fitting part 24 one of the series circuits is cut off, and when the second service plug 21 is pulled out from the second plug fitting part 26 the other series circuit is cut off.

Figure 5:
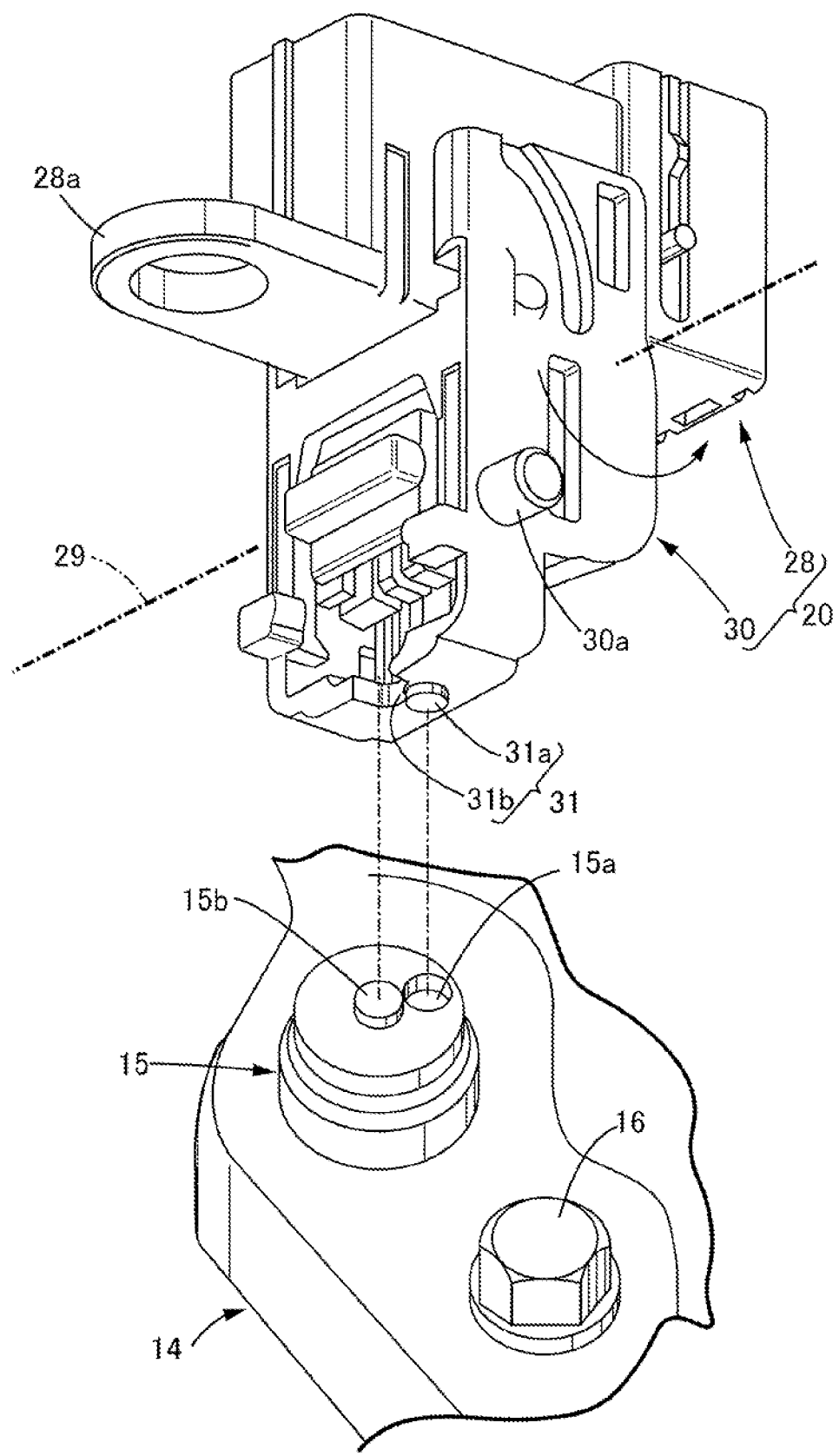
FIG. 5 is a perspective view of a special bolt and a first service plug.

As shown in FIG. 5, the first service plug 20 includes a terminal part 28 that can be inserted into the first plug fitting part 24, and a grip part 30 that is pivotably supported on the terminal part 28 so that it can swing via a rotational axis 29, and the grip part 30 can swing through 90° between a projecting position shown in FIG. 5 and a retracted position shown in FIG. 4. The terminal part 28 includes a plate-shaped projecting portion 28a projecting in a direction orthogonal to the insertion direction of the first service plug 20. The grip part 30 includes a pin-shaped erroneous assembly-preventing projection 30a projecting in a direction orthogonal to the insertion direction of the first service plug 20. Formed integrally with the extremity of the grip part 30 is a special tool 31 formed from a projection 31a and a hole 31b, the special tool 31 being capable of engaging with holes 15a and projections 15b respectively of head parts of the special bolts 15.

The second service plug 21 has a shape that is basically mirror symmetric with the first service plug 20 described above, but it is different in terms of having no special tool 31. That is, the special tool 31 is provided only on the first service plug 20 and is not provided on the second service plug 21.

As shown in FIG. 3, an erroneous assembly-preventing projection 22a is projectingly provided in the interior of the first housing part 22 so as to be positioned on the side vertically opposite to the erroneous assembly-preventing projection 30a of the inserted first service plug 20. An erroneous assembly-preventing projection 23a is projectingly provided in the interior of the second housing part 23 so as to be positioned on the side vertically opposite to the erroneous assembly-preventing projection 30a of the inserted second service plug 21.

As shown in FIG. 3 and FIG. 4, a plate-shaped first lid 33 having an annular seal member 32 on the outer periphery is fitted into an opening of the first housing part 22 and fastened by two bolts 34. Furthermore, an annular component 36 having an annular seal member 35 on the outer periphery is fitted into an opening of the second housing part 23, which is set back by a step relative to the opening of the first housing part 22. A plate-shaped second lid 38 having an annular seal member 37 on the outer periphery is fitted into an opening of the annular component 36 and is fastened with two bolts 39 together with the annular component 36. A rod-shaped interlock bar 36a is provided in the interior of the annular component 36, the interlock bar 36a being superimposed on the deeper side of a projecting portion 28a of the second service plug 21 fitted into the second plug fitting part 26. Furthermore, an interlock projection 36b is projectingly provided on the outer peripheral part of the annular component 36 fitted into the opening of the second housing part 23, the interlock projection 36b being superimposed on the front side of the first lid 33 fitted into the first housing part 22.

The operation of the embodiment of the present invention having the above arrangement is now explained.

Figure 6A:
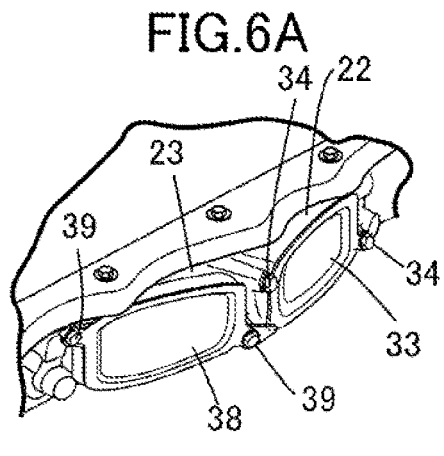
FIGS. 6A to 6F are views for explaining the procedure when the service plug is pulled out.
Figure 6D:
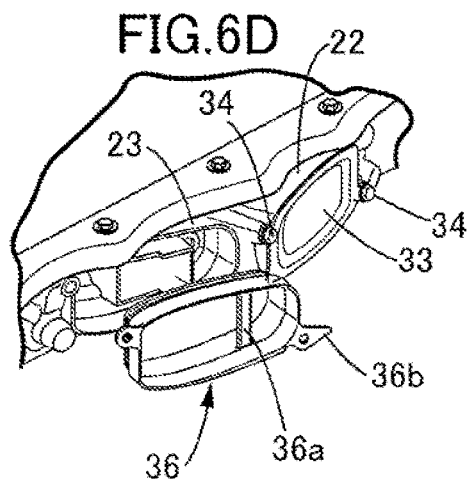
Figure 6B:
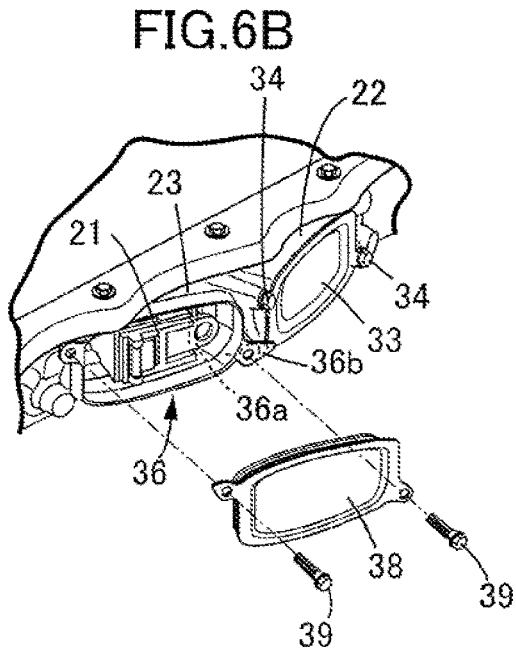
Figure 6E:
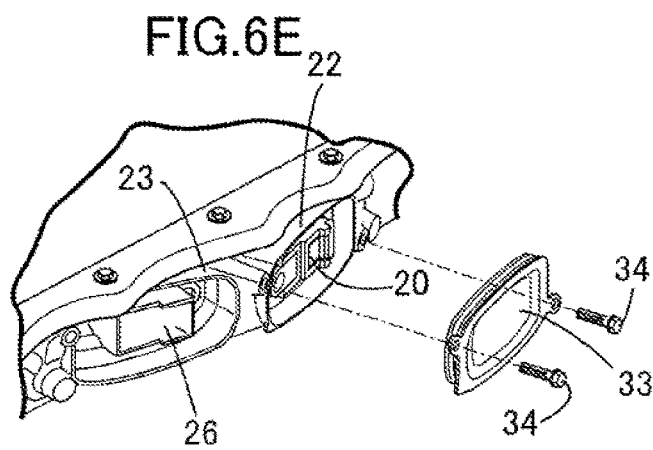
Figure 6C:
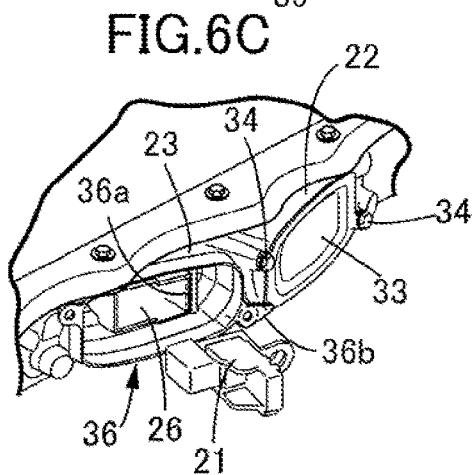
Figure 6F:
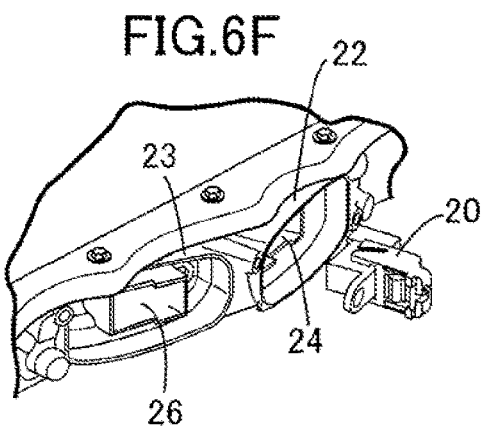

In order to detach the cover 14 from the case 13 of the battery pack 11, first, in a state in which both the first lid 33 and the second lid 38 are attached to the case 13 (see FIG. 6A), the two bolts 39 are loosened, the second lid 38 is detached from the annular component 36 (see FIG. 6B), and the second service plug 21 is then pulled out from the second plug fitting part 26 within the second housing part 23 by raising the grip part 30 from the terminal part 28 (see FIG. 6C). In this process, since the interlock bar 36a provided on the annular component 36 fitted into the second housing part 23 is positioned on the deeper side of the projecting portion 28a of the terminal part 28 of the second service plug 21 (see FIG. 3 and FIG. 4), even if an attempt is made to detach the annular component 36 before the second service plug 21, the interlock bar 36a interferes with the projecting portion 28a, thus making it impossible to detach the annular component 36.

Subsequently, after the annular component 36 is detached from the second housing part 23 (see FIG. 6D), the two bolts 34 are loosened, and the first lid 33 is detached from the first housing part 22 (see FIG. 6E). In this process, if in a state in which the annular component 36 has not yet been detached from the second housing part 23 an attempt is made to detach the first lid 33 from the first housing part 22, since the interlock projection 36b provided on the annular component 36 is positioned so as to be superimposed on the front side of the first lid 33 (see FIG. 3 and FIG. 4), the first lid 33 cannot be detached. Finally, the first service plug 20 is pulled out from the first plug fitting part 24 within the first housing part 22 by raising the grip part 30 from the terminal part 28 (see FIG. 6F).

When the first service plug 20 is pulled out by the above procedure, it is possible, by loosening the four special bolts 15 fixing the cover 14 to the case 13 of the battery pack 11 by the special tool 31 provided integrally with the first service plug 20, to detach the cover 14 from the case 13 (see FIG. 5).

As described above, since, in order to pull out the first service plug 20, it is necessary to always pull out the second service plug 21 prior thereto, it is ensured that the second service plug 21 has already been pulled out at the time when the first service plug 20 is pulled out and the special tool 31 becomes available for use, and a situation in which the cover 14 is detached from the case 13 in a state in which the second service plug 21 is fitted can reliably be prevented.

In order to fit the first service plug 20 and the second service plug 21, the procedure shown in FIGS. 6A to 6F may be followed in the reverse order.

Figure 7A:
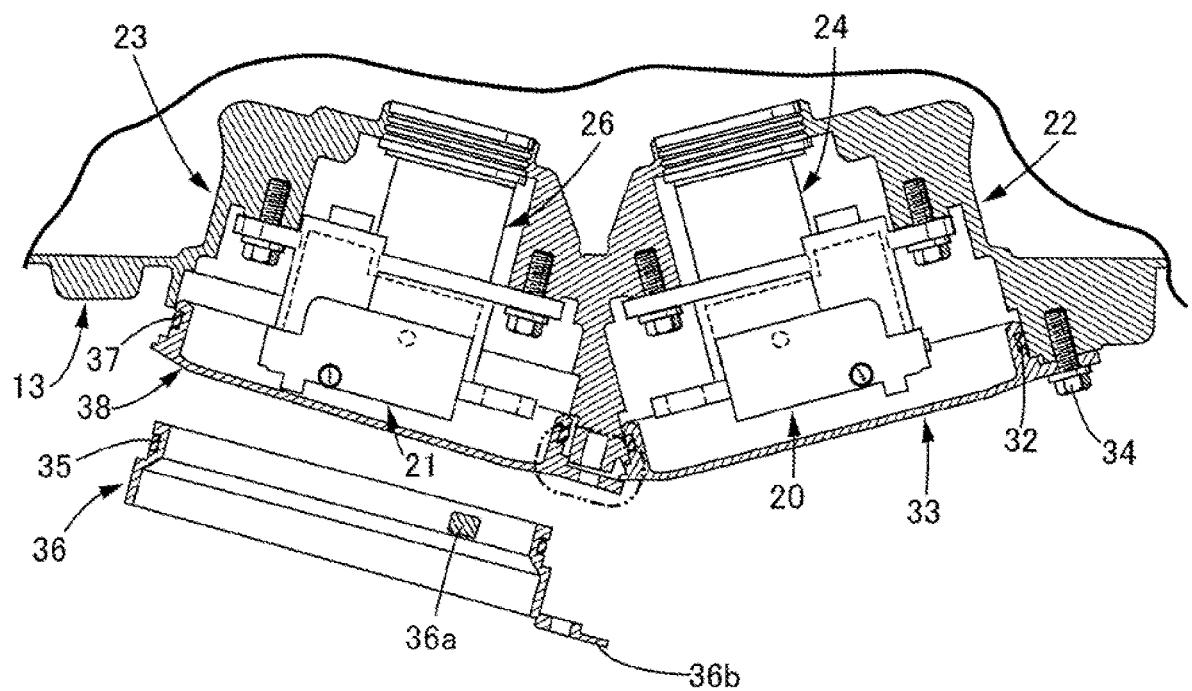
FIGS. 7A and 7B are diagrams for explaining the operation of preventing erroneous assembly.

Furthermore, as shown in FIG. 7A, if an attempt is made to erroneously fit the second lid 38 when the annular component 36 should be fitted into the second housing part 23, since a flange part of the second lid 38 interferes with a boss part of a bolt hole provided in the opening of the second housing part 23, the second lid 38 cannot be seated in the opening of the second housing part 23, thereby reliably preventing erroneous assembly of the second lid 38.

Figure 7B:
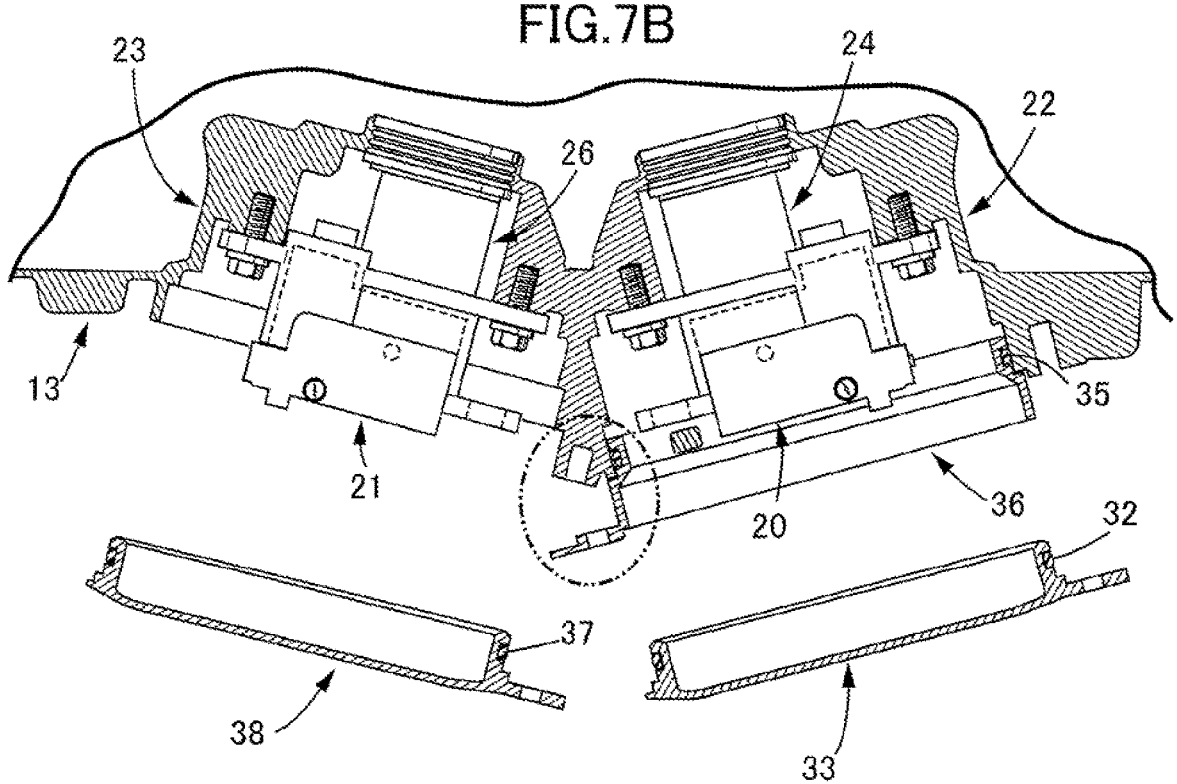

Moreover, as shown in FIG. 7B, if an attempt is made to erroneously fit the annular component 36, which should be fitted into the second housing part 23, into the first housing part 22, since the annular component 36 cannot be sufficiently deeply inserted into the opening of the first housing part 22, the annular component 36 cannot be seated on the opening of the second housing part 23, thereby reliably preventing erroneous assembly of the annular component 36.

Furthermore, as shown in FIG. 3, since the first service plug 20 and the second service plug 21 are mirror symmetric members, if an attempt is made to erroneously insert the second service plug 21 into the first housing part 22, since the erroneous assembly-preventing projection 30a of the grip part 28 of the second service plug 21 interferes with the erroneous assembly-preventing projection 22a of the first housing part 22, it is impossible to insert the second service plug 21 into the first housing part 22. Similarly, if an attempt is made to erroneously insert the first service plug 20 into the second housing part 23, since the erroneous assembly-preventing projection 30a of the grip part 28 of the first service plug 20 interferes with the erroneous assembly-preventing projection 23a of the second housing part 23, it is impossible to insert the first service plug 20 into the second housing part 23.

Since the battery pack 11 is provided beneath the floor of the vehicle, there is a possibility that water or mud will become attached to the first service plug 20 or the second service plug 21, but since the first service plug 20 and the second service plug 21 are housed in the first housing part 22 and the second housing part 23 blocked by the first lid 33 and the second lid 38, there is no possibility that water or mud will become attached thereto. Moreover, since the first housing part 22 and the second housing part 23 are provided on the side wall of the case 13 of the battery pack 11, not only is it possible to access the first service plug 20 and the second service plug 21 in a state in which the battery pack 11 is mounted on the vehicle, but also it becomes difficult for the first service plug 20 and the second service plug 21 to be damaged due to contact with the ground compared with a case in which the first housing part 22 and the second housing part 23 are provided on a bottom wall of the case 13.

An embodiment of the present invention is explained above, but the present invention may be modified in a variety of ways as long as the modifications do not depart from the gist of the present invention.

For example, in the embodiment, in order to make it impossible to detach the first service plug 20 unless the second service plug 21 is detached, the interlock projection 36b of the annular component 36 is positioned on the front side of the first lid 33, but part of the second service plug 21 may be positioned on the front side of part of the first service plug 20.

Furthermore, in the embodiment the two series circuits are connected in parallel, but three or more series circuits may be connected in parallel. In this case, the number of service plugs is also three or more, and one in which the present invention is applied to at least two service plugs thereamong falls within the scope of the rights.

What is claimed is:

1. A battery pack comprising
   a plurality of batteries that provide power to drive an electric vehicle,
   a cover and a case that houses the plurality of batteries,
   a first service plug and a second service plug that cut off electrical connection of the plurality of batteries, and
   a first housing part and a second housing part that are provided on the case and house the first service plug and the second service plug respectively,
   wherein the cover is fixed to the case by a special component, the first service plug comprises a special tool that detaches the special component, part of the first service plug or part of a first lid that closes the first housing part and part of the second service plug or part of a component disposed between the second housing part and a second lid that closes the second housing part are superimposed on one another via a superimposed part, and in the superimposed part, part of the first service plug or part of the first lid closing the first housing part is positioned on a deeper side in a direction in which the first service plug and the first lid are detached, and a projecting portion fixed relative to the second lid that projects to a position relative to the first lid that prevents detachment of the first service plug unless the second service plug is detached.

2. The battery pack according to claim 1, wherein the component disposed between the second housing part and the second lid is an annular component that is fitted into an inner periphery of the second housing part via a seal member, the annular component comprises said projecting portion outside the seal member, and the projecting portion is superimposed on a front side of the first lid.

3. The battery pack according to claim 2, wherein the annular component comprises an engagement portion that can engage with the second service plug, and part of the engagement portion is superimposed further on a deep side than part of the second service plug.

4. The battery pack according to claim 1, wherein the case and the cover are disposed beneath a floor of a vehicle.

5. The battery pack according to claim 2, wherein the case and the cover are disposed beneath a floor of a vehicle.

6. The battery pack according to claim 3, wherein the case and the cover are disposed beneath a floor of a vehicle.

7. The battery pack according to claim 4, wherein the first housing part and the second housing part are provided on a side wall of the case.

8. The battery pack according to claim 5, wherein the first housing part and the second housing part are provided on a side wall of the case.

9. The battery pack according to claim 6, wherein the first housing part and the second housing part are provided on a side wall of the case.

* * * * *